US008417033B2

(12) United States Patent
Fan

(10) Patent No.: US 8,417,033 B2
(45) Date of Patent: Apr. 9, 2013

(54) GRADIENT BASED BACKGROUND SEGMENTATION AND ENHANCEMENT OF IMAGES

(75) Inventor: Jian Fan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1536 days.

(21) Appl. No.: 11/741,188

(22) Filed: Apr. 27, 2007

(65) Prior Publication Data
US 2008/0267497 A1    Oct. 30, 2008

(51) Int. Cl.
*G06K 9/34*   (2006.01)
*G06K 9/40*   (2006.01)
*G06K 9/00*   (2006.01)

(52) U.S. Cl. .................. 382/173; 382/176; 382/254

(58) Field of Classification Search .......... 382/128, 382/162, 164, 165, 167, 172, 173, 176, 181, 382/195, 199, 224, 225, 266, 270, 275, 305; 345/428, 620, 625, 660, 670, 698; 358/515, 358/518, 522, 538
See application file for complete search history.

(56) References Cited

U.S. PATENT DOCUMENTS

| | | | | |
|---|---|---|---|---|
| 4,499,598 | A * | 2/1985 | Chittineni | 382/266 |
| 5,093,871 | A * | 3/1992 | Klein et al. | 382/172 |
| 6,263,091 | B1 * | 7/2001 | Jain et al. | 382/125 |
| 6,625,303 | B1 * | 9/2003 | Young et al. | 382/132 |
| 6,912,309 | B2 * | 6/2005 | Lee | 382/197 |
| 7,091,974 | B2 | 8/2006 | Masera et al. | |
| 7,349,573 | B2 * | 3/2008 | Porikli | 382/164 |
| 7,379,572 | B2 * | 5/2008 | Yoshida et al. | 382/128 |
| 7,620,241 | B2 * | 11/2009 | Fan et al. | 382/167 |
| 7,672,507 | B2 * | 3/2010 | Fan | 382/164 |
| 2005/0013483 | A1 | 1/2005 | Watson | |
| 2006/0269111 | A1 | 11/2006 | Stoecker et al. | |
| 2008/0267497 | A1 * | 10/2008 | Fan | 382/173 |
| 2009/0123070 | A1 * | 5/2009 | Xiaoying | 382/176 |

FOREIGN PATENT DOCUMENTS

| WO | WO-2006/088641 | 8/2006 |
|---|---|---|
| WO | WO-2006/088641 | 11/2006 |

OTHER PUBLICATIONS

Jos B.T.M. Roerdink et al. "The Watershed Transform: Definitions, Algorithms and Parallelization Strategies," Fundamenta Informaticae 41, pp. 187-228 (2001).
C. Tomasi et al., "Bilateral Filtering for Gray and Color Images," Proc. the 1998 IEEE Int'l Conf. Comp. Vis., Bombay, India (1998).
Luc Vincent et al., "Watersheds in Digital Spaces: An Efficient Algorithm Based on Immersion Simulations," IEEE Trans Pattern Anal. & Mach. Intel, 13:6 (1991).
Silvano Di Zenzo, "A Note on the Gradient of a Multi-Image," Computer Vision, Graphics & Image Processing, 33, 116-125 (1986).

(Continued)

Primary Examiner — Amir Alavi

(57) ABSTRACT

Methods, apparatus, and machine-readable media for segmenting and enhancing images are described. In one aspect, gradient magnitude values at respective pixels of a given image are determined. The gradient magnitude values are thresholded with a global threshold to produce thresholded gradient magnitude values. The pixels are segmented into respective groups in accordance with a watershed transform of the thresholded magnitude values. A classification record is generated. The classification record labels as background pixels ones of the pixels segmented into one of the groups determined to be largest in size and labels as non-background pixels ones of the pixels segmented into any of the groups except the largest group.

20 Claims, 6 Drawing Sheets

OTHER PUBLICATIONS

Jian Liang et al., "Camera-based analysis of text and documents: a survey," IJDAR (2005) 7: 84-104 (Jun. 21, 2005).

Shih-Chang Hsia et al., A Cost-Effective Line-Based Light-Balancing Technique Using Adaptive Processing,IEEE Trans. Image Processing, vol. 15, No. 9, (Sep. 2006).

Pilu et al., "A light-weight text image processing method for handheld embedded cameras," Hewlett-Packard Company, HP Laboratories Bristol, HPL-2002-82 (2002).

Hill, P.R. et al, "Image segmentation using a texture gradient based watershed transform" IEEE Transactions, V.12 (12), Dec. 2003, pp. 1618-1633.

Haris, K et al, "Model-based morphological segmentation and labeling of coronary angiograms", Medical Imaging, IEEE Transactions, V18(10), Oct. 1999, pp. 1003-1015.

Yan, Wo et al, "A new segment method for segment-based image coding" Machine Learning and Cybernetics, 2005, Proc. of 2005 Int'l conf, V9, Aug. 2005, pp. 5376-5381.

Lin, M.G et al, "Hybrid image segmentation using watersheds and adaptive region growing" Visual Information Engineering, 2003, Jul. 7-9, 2003, pp. 282-285.

"Robust Watershed Segmentation Using the Wavelet Transform", C.R. Jung etal, XV Brazilian Symposium on Computer Graphics and Image Processing, pp. 131-137.

"Scanned image correction technology based on characteristics measurement of distorted image", Huang Su Juan, etc, photoelectron. Laser, vol. 17, No. 2, pp. 231-236.

* cited by examiner

```
┌─────────────────────────────────────────┐
│ Determine Gradient Magnitude Values At  │
│ Respective Pixels Of A Given Image      │─ 24
└─────────────────────────────────────────┘
                    ▼
┌─────────────────────────────────────────┐
│ Threshold The Gradient Magnitude Values │
│ With A Global Threshold To Produce      │─ 26
│ Thresholded Gradient Magnitude Values   │
└─────────────────────────────────────────┘
                    ▼
┌─────────────────────────────────────────┐
│ Segment The Pixels Into Respective      │
│ Groups In Accordance With A Watershed   │─ 28
│ Transform Of The Thresholded Magnitude  │
│ Values                                  │
└─────────────────────────────────────────┘
                    ▼
┌─────────────────────────────────────────┐
│ Generate A Classification Record        │
│ Labeling As Background Pixels Ones Of   │
│ The Pixels Segmented Into One Of The    │
│ Groups Determined To Be Largest         │─ 30
│ In Size And Labeling As Non-background  │
│ Pixels Ones Of The Pixels Segmented     │
│ Into Any Of The Groups Except The       │
│ Largest Group                           │
└─────────────────────────────────────────┘
```

FIG. 3

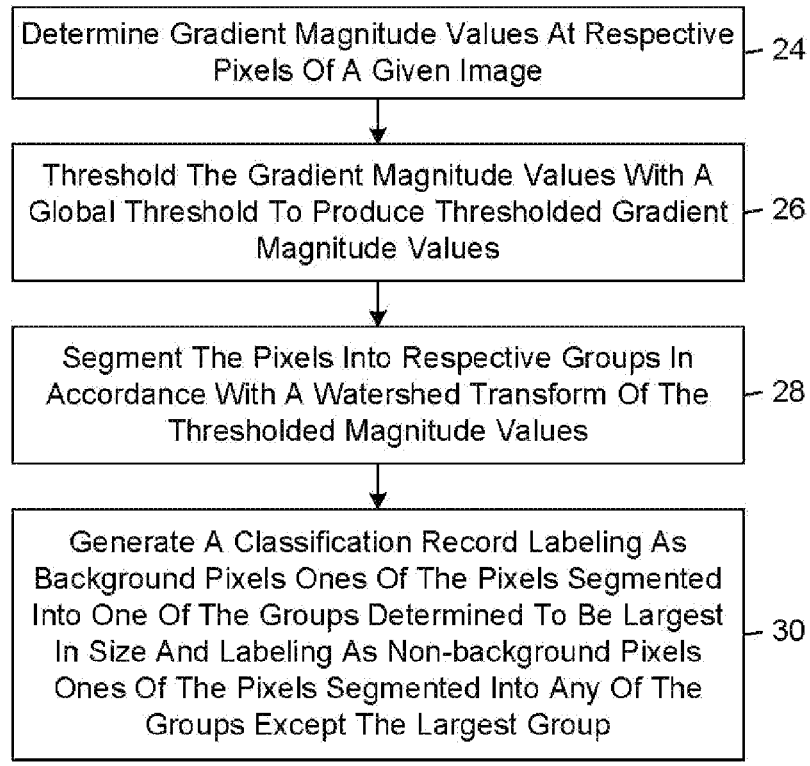

FIG. 4

|    |    |    |   |
|----|----|----|---|
| 14 | 12 | 10 | 8 |
| 16 | 10 | 8  | 6 |
| 18 | 8  | 6  | 4 |
| 0  | 6  | 4  | 2 |
← 34
|    |    |    |    |
|----|----|----|----|
| B2 | B2 | B2 | B2 |
| B2 | B2 | B2 | B2 |
| W  | B2 | B2 | B2 |
| B1 | W  | B2 | B2 |
FIG. 5A
(PRIOR ART)
FIG. 5B
(PRIOR ART)
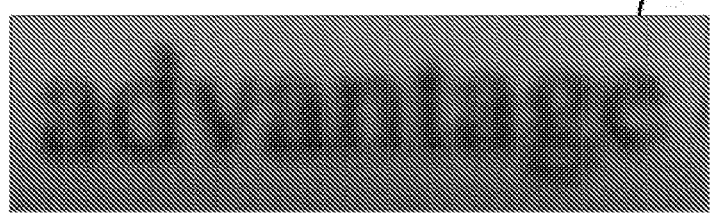
FIG. 6A
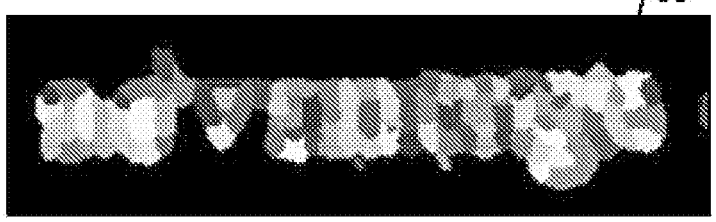
FIG. 6B

FIG. 6C
FIG. 7
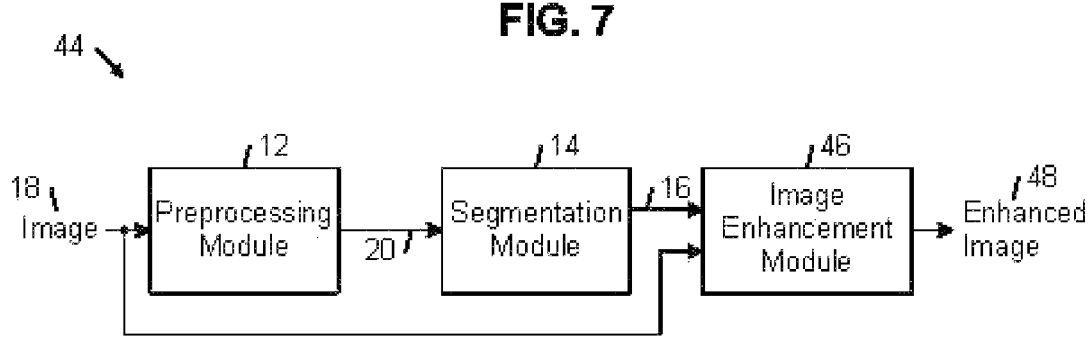
FIG. 8

GRADIENT BASED BACKGROUND SEGMENTATION AND ENHANCEMENT OF IMAGES

BACKGROUND

Image segmentation typically involves separating object regions of an image from background regions of the image. Many different approaches for segmenting an image have been proposed, including thresholding, region growing, and watershed transform based image segmentation processes. The segmentation results of such processes may be used for a wide variety of different applications, including object extraction for object description or recognition. In general, noise reduces the accuracy with which an image segmentation process can segment objects from background regions.

Text-like objects in digital images that are captured by camera-equipped handheld devices (e.g., digital cameras, cellular telephones, and personal digital assistants) often are degraded by nonuniform illumination and blur. The presence of these artifacts significantly degrades the overall appearance quality of the reproduced digital images. In addition, such degradation adversely affects OCR (optical character recognition) accuracy.

What are needed are apparatus and methods that are capable of segmenting and enhancing document images in ways that are robust to text font size, blur level and noise.

SUMMARY

In one aspect, the invention features a method in accordance with which gradient magnitude values at respective pixels of a given image are determined. The gradient magnitude values are thresholded with a global threshold to produce thresholded gradient magnitude values. The pixels are segmented into respective groups in accordance with a watershed transform of the thresholded magnitude values. A classification record is generated. The classification record labels as background pixels ones of the pixels segmented into one of the groups determined to be largest in size and labels as non-background pixels ones of the pixels segmented into any of the groups except the largest group.

The invention also features an apparatus and a machine readable medium storing machine-readable instructions causing a machine to implement the method described above.

Other features and advantages of the invention will become apparent from the following description, including the drawings and the claims.

DESCRIPTION OF DRAWINGS

FIG. 3 is a flow diagram of an embodiment of an image processing method.

FIG. 4 is an example of an image composed of gradient magnitude values derived from the image of FIG. 2 in accordance with an embodiment of the method of FIG. 3.

FIG. 5A is a diagrammatic view of an array of devised gradient magnitude values at respective pixels of an illustrative image.

FIG. 5B is a diagrammatic view of an array of labels assigned to the pixels of the image shown in FIG. 5A in accordance with a watershed transform based image segmentation process.

FIG. 6A is an example of an image containing text.

FIG. 6B is a grayscale image showing different labels that were assigned to the pixels of the image of FIG. 6A in accordance with an embodiment of the segmentation process in the method shown in FIG. 3.

FIG. 6C is an example of a classification record in the form of a binary segmentation map generated from the grayscale image of FIG. 6B in accordance with an embodiment of the classification record generation process in the method shown in FIG. 3.

FIG. 7 is an example of a classification record in the form of a binary segmentation map in which black pixels represent object pixels detected in the image of FIG. 2 and white pixels represent background pixels detected in the image of FIG. 2.

FIG. 8 is a block diagram of an embodiment of the image processing system shown in FIG. 1.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail below are capable of segmenting and enhancing images in ways that are robust to blur level and noise. These embodiments incorporate global thresholding prior to watershed transform based image segmentation in ways that achieve improved noise resistant results, especially for images containing text. The global thresholding eliminates or breaks noise structures in the images before performing the watershed transform based image segmentations. Some embodiments use the segmentation result to enhance the document images in various ways, including correcting for nonuniform illumination, darkening target object regions, and sharpening target object regions. Implementations of these embodiments are particularly useful for enhancing text in ways that are robust to text font size, blur level and noise.

II. Overview

Figures 1, 2:
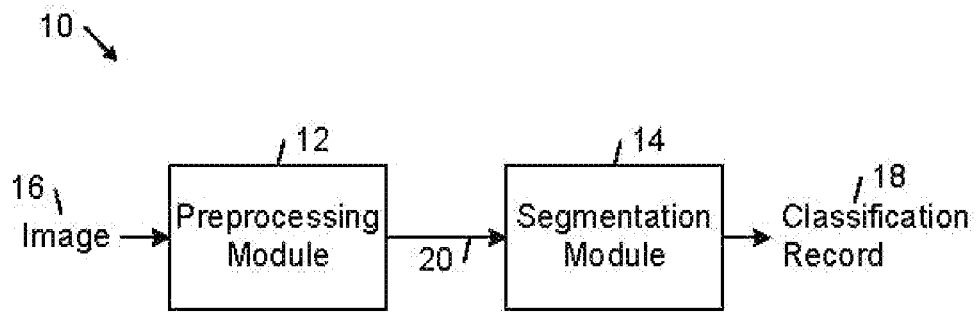
FIG. 1 is a block diagram of an embodiment of an image processing system.
FIG. 2 is an example of an image of nonuniformly illuminated text.

FIG. 1 shows an embodiment of an image processing system 10 that includes a preprocessing module 12 and a segmentation module 14. The image processing system produces from an image 16 a classification record 18 that labels the pixels of the image 16 either as background pixels or non-background pixels. In this process, the preprocessing module 12 processes the image 16 to produce an intermediate image 20, which has characteristics that improve the accuracy with which the segmentation module 14 can distinguish target object regions from background regions in the image 16.

The image 16 may correspond to any type of digital image, including an original image (e.g., a video keyframe, a still image, or a scanned image) that was captured by an image sensor (e.g., a digital video camera, a digital still image camera, or an optical scanner) or a processed (e.g., sub-sampled, filtered, reformatted, enhanced or otherwise modified) version of such an original image. FIG. 2 shows an example 22 of the image 16 that contains nonuniformly illuminated text. In the following detailed description, the exemplary image 22 and the various image data derived therefrom are used for illustrative purposes only to explain one or more aspects of one or more embodiments of the invention.

In general, the classification record 18 may be used for a wide variety of different purposes, including image enhancement, object detection, object tracking, object description, and object recognition. Some of the embodiments of the invention that are described in detail below use the classification record 18 to perform one or more of the following image enhancement operations on the image 16: reducing the effects of nonuniform illumination; darkening and sharpening text-like objects.

III. Segmenting an Image into Background Regions and Target Object Regions

A. Overview

FIG. 3 shows an embodiment of a method that is implemented by the image processing system 10. In accordance with this method, the preprocessing module 12 determines gradient magnitude values at respective pixels of the image 16 (FIG. 3, block 24). The preprocessing module 12 thresholds the gradient magnitude values with a global threshold to produce thresholded gradient magnitude values (FIG. 3, block 26). The segmentation module 14 segments the pixels of the image 16 into groups in accordance with a watershed transform of the thresholded gradient magnitude values (FIG. 3, block 28). The segmentation module 14 generates the classification record 18. The classification record 18 labels as background pixels ones of the pixels segmented into one of the groups determined to be largest in size and labels as non-background pixels ones of the pixels segmented into any of the groups except the largest group (FIG. 3, block 30).

B. Determining Gradient Magnitude Values

As explained above, the preprocessing module 12 determines gradient magnitude values at respective pixels of the image 16 (FIG. 3, block 24). In some embodiments, the preprocessing module 12 denoises the pixel values of the image 16 before determining the gradient magnitude values. For this purpose any type of denoising filter may be used, including a Gaussian smoothing filter and a bilateral smoothing filter. In other embodiments, the preprocessing module 12 determines the gradient magnitude values directly from pixel values of the image 16.

In general, the preprocessing module 12 may use any type of gradient filter or operator to determine the gradient magnitude values. If the image 16 is a grayscale image, the preprocessing module 12 may determine the gradient magnitude values using, for example, a basic derivative filter, a Prewitt gradient filter, a Sobel gradient filter, a Gaussian gradient filter, or another type of morphological gradient filter. If the image 16 is a color image, the preprocessing module 12 may convert the image 16 into a grayscale image and apply a gradient filter of the type listed above to the grayscale values to determine the gradient magnitudes. Alternatively, the preprocessing module 12 may convert the color image into a YCrCb color image and apply a gradient filter of the type listed above to the luminance (Y) values to determine the gradient magnitudes. In some embodiments, the preprocessing module 12 computes each of the gradient magnitude values from multiple color space components (e.g., red, green, and blue components) of the color image. For example, in some of these embodiments, the preprocessing module 12 determines the magnitudes of color gradients in the color image in accordance with the color gradient operator described in Silvano DiZenzo, "A Note on the Gradient of a Multi-Image," Computer Vision, Graphics, and Image Processing, vol. 33, pages 116-125 (1986). FIG. 4 depicts an example of an image 32 that is composed of color gradient magnitude values that were derived from a color version of the image 22 (see FIG. 2) in accordance with such a color gradient operator.

C. Global Thresholding Gradient Magnitude Values

As explained above, the preprocessing module 12 thresholds the gradient magnitude values with a global threshold to produce thresholded gradient magnitude values (FIG. 3, block 26). This global thresholding process eliminates or breaks noise structures in the images before performing the watershed transform based image segmentation. In this way, the problems of over-segmentation and inaccurate segmentation results due to such noise structures may be reduced. The preprocessing module 12 typically uses an empirically determined global threshold to threshold the gradient magnitude values. In some embodiments, the preprocessing module 12 thresholds the gradient magnitude values with a global threshold ($\tau_{GLOBAL}$) that is determined in accordance with equation (1):

$$\tau_{GLOBAL} = \begin{cases} k \cdot g_{MAX} & \text{if } k \cdot g_{MAX} > \tau_{MIN} \\ \tau_{MIN} & \text{otherwise} \end{cases} \quad (1)$$

where k is a real number, $g_{MAX}$ is the maximum gradient magnitude value, and $\tau_{MIN}$ is an empirically determined minimum global threshold value. In one exemplary embodiment, the range of gradient magnitude values is from 0 to 255, k=0.1 and $\tau_{MIN}$=5.

The resulting thresholded gradient magnitude values, which correspond to the intermediate image 20 (see FIG. 1), are passed to the segmentation module 14 for segmentation processing.

D. Segmenting Thresholded Gradient Magnitude Values

As explained above, the segmentation module 14 segments the pixels of the image 16 into groups in accordance with a watershed transform of the thresholded gradient magnitude values (FIG. 3, block 28).

In the course of computing the watershed transform of the gradient magnitude values, the segmentation module 14 identifies basins and watersheds in the thresholded magnitude values, assigns respective basin labels to those pixels corresponding to ones of the identified basins, assigns a unique shared label to those pixels corresponding to the watersheds, and performs a connected components analysis on the assigned labels. The segmentation module 14 may compute the watershed transform in accordance with any one of a wide variety of different methods. In some embodiments, the basins are found first and the watersheds may be found by taking a set complement whereas, in other embodiments, the image is partitioned completely into basins and the watersheds may be found by boundary detection (see, e.g., J. B. T. M. Roerdink et al., "The Watershed Transform Definitions, Algorithms and Parallelization Strategies, Fundamenta Informaticae, vol. 41, pages 187-228 (2001)). In some embodiments, the segmentation module 14 computes the watershed transform of the thresholded gradient magnitude values in accordance with the watershed calculation method described in Luc Vincent et al., "Watersheds in Digital Spaces: An Efficient Algorithm Based on Immersion Simulations," IEEE Transactions on Pattern Analysis and Machine Intelligence, vol. 13, no. 6 (June 1991).

In general, the segmentation module 14 may perform any one of a wide variety of different connected components analyses on the assigned labels. For example, in one connected component labeling approach, the labels assigned to the pixels are examined, pixel-by-pixel in order to identify connected pixel regions (or "blobs", which are regions of adjacent pixels that are assigned the same label). For each given pixel, the label assigned to the given pixel is compared to the labels assigned to the neighboring pixels. The label assigned to the given pixel is changed or unchanged based on the labels assigned to the neighboring pixels. The number of neighbors examined and the rules for determining whether to keep the originally assigned label or to re-classify the given pixel depends on the measure of connectivity being used (e.g., 4-connectivity or 8-connectivity).

FIG. 5A shows a diagrammatic view of an array 34 of devised gradient magnitude values at respective pixels of an illustrative image. FIG. 5B shows a diagrammatic view of an array of labels assigned to the pixels of the image shown in FIG. 5B in accordance with a watershed transform based image segmentation process and a connected component re-labeling process based on 4-connectivity. In FIG. 5B, the labels B1 and B2 identify respective basins and the label W identifies the watershed pixels that were detected in the array 34.

FIG. 6A shows an example of an image 36 containing text (i.e., the word "advantage") and FIG. 6B shows a grayscale image 38 of the resulting (numbered) labels that were assigned to the pixels of the image 36 in accordance with an embodiment of the segmentation process of block 28 of FIG. 3.

In some embodiments, after the pixel connectivity analysis has been performed, the watershed pixels are merged with the neighboring region with the largest label number to produce a segmentation of the pixels of the image 16 into a final set of identified groups.

E. Generating a Classification Record

As explained above, the segmentation module 14 generates the classification record 18, which labels as background pixels ones of the pixels segmented into one of the identified groups determined to be largest in size and labels as non-background pixels ones of the pixels segmented into any of the identified groups except the largest group (FIG. 3, block 30). The largest group may be identified in a variety of different ways. In some embodiments, the largest grouped is determined by selecting the group having the largest number of pixels.

In some embodiments, the segmentation module 14 records in the classification record 18 a first binary value (e.g., "1" or "white") for each of the pixels segmented into the largest group and second binary value (e.g., "0" or "black") for each of the pixels segmented into any of the groups except the largest group. For example, FIG. 6C shows an example of a classification record generated for the image 36 (see FIG. 6A) in the form of a binary segmentation map 40 that was generated from the grayscale image 38 (see FIG. 6B) in accordance with an embodiment of the classification record generation process of block 30 in FIG. 3. In the binary segmentation map 40, the black pixels represent object pixels that were detected in the image 36 (see FIG. 6A) and the white pixels represent background pixels that were detected in the image 36.

Referring back to FIG. 6B, the watershed transform based segmentation performed in block 28 of FIG. 3 tends to over-segment the text characters appearing in images 22, 36. As shown in FIG. 6C, however, the background pixels in these images 22, 36 readily can be identified as the largest connected component in the pixel labels assigned by the watershed transform segmentation process in spite of such over-segmentation.

FIG. 7 shows an example of a graphical representation of a classification record that was generated for the image 22 (see FIG. 2) in the form of a binary segmentation map 42 in which black pixels represent object pixels detected in the image 22 and white pixels represent background pixels detected in the image 22.

IV. Enhancing an Image Based on its Associated Classification Record

A. Overview

As explained above, the classification record 18 may be used for a wide variety of different purposes, including image enhancement, object detection, object tracking, object description, and object recognition.

FIG. 8 shows an embodiment 44 of the image processing system 10 that additionally includes an image enhancement module 46. In some embodiments, the image enhancement module 46 produces an enhanced image 48 by performing one or more of the following image enhancement operations on the image 16 based on the classification record 18: reducing the effects of nonuniform illumination; darkening target object regions; and sharpening target object regions.

B. Illumination Correction

In some embodiments, the image enhancement module 46 is operable to produce the enhanced image 48 by correcting for nonuniform illumination in the image 16.

In some embodiments, the illumination correction is based on the following image formation model:

$$I(x,y)=R(x,y) \cdot L(x,y) \quad (2)$$

where I(x,y) is the measured intensity value, R(x,y) the surface reflectivity value, and L(x,y) is the illuminant value at pixel (x,y) of the image 16, respectively.

In accordance with this model, the illuminant values of background pixels (as indicated by the classification record 18) are assumed to be proportional to the luminance values of the pixels. If the image 16 is a grayscale image, the estimated illuminant values $\hat{L}(x,y)$ for the background pixels are the grayscales is values of the background pixels (x,y). If the image 16 is a color image, the estimated illuminant values $\hat{L}(x,y)$ for the background pixels are obtained, for example, by converting the image 16 into a grayscale color space or the YCrCb color space and setting the estimated luminant values $\hat{L}(x,y)$ to the grayscale values or the luminance values (Y) of the background pixels (x,y) in the converted image. The illuminant values for the non-background pixels may be estimated from the estimated illuminant values of the neighboring background pixels in a variety of different ways, including using interpolation methods and image impainting methods.

Figure 9:
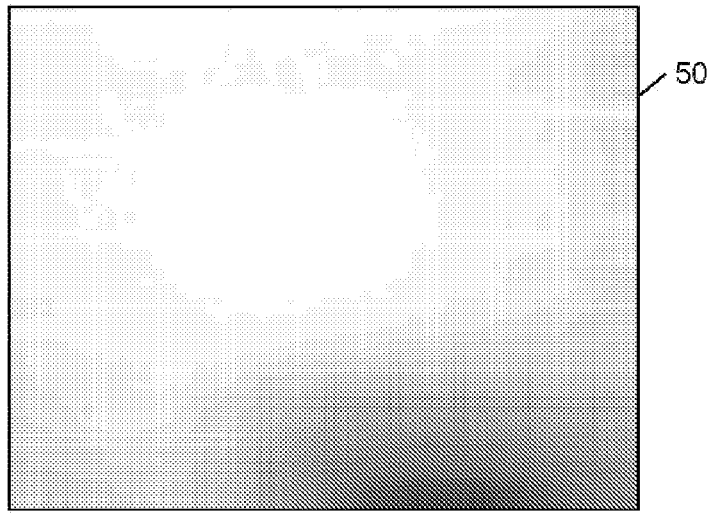
FIG. 9 is an example of an image composed of illuminant values estimated for the pixels of the image of FIG. 2 in accordance with an embodiment of the invention.

FIG. 9 depicts an example of an image 50 that is composed of illuminant values that were estimated for the pixels of the image 22 (see FIG. 2) in accordance with the method described above.

In some embodiments, the illumination-corrected pixel values E(x,y) of the enhanced image 48 are estimated from ratios of spatially corresponding ones of the pixel values of the image 16 to respective tone values that are determined from the estimated illuminant values in accordance with equation (3):

$$E(x, y) = \hat{R}(x, y) = s \cdot \frac{I(x, y)}{T(\hat{L}(x, y))}. \tag{3}$$

where s is a scale factor, I(x,y) is the value of pixel (x,y) in the image 16, $\hat{L}$(x,y) is the illuminant value estimated for pixel (x,y), and T($\hat{L}$(x,y)) is a function that maps the estimated illuminant value to a respective tone value. In one exemplary embodiment in which pixel values range from 0 to 255, the scale factor s is set to 255. The tone mappings corresponding to the function T($\hat{L}$(x,y)) typically are stored in a lookup table (LUT).

In some embodiments, the tone mapping function T($\hat{L}$(x, y)) maps the estimated illuminant values to themselves (i.e., T($\hat{L}$(x,y)=$\hat{L}$(x,y))). In these embodiments, the resulting enhanced image 48 corresponds to an illumination corrected version of the original image 16. In other embodiments, the tone mapping function T($\hat{L}$(x,y)) includes at least one other image enhancement (e.g., selective darkening and selective sharpening) as described in detail below.

C. Selective Darkening

In some embodiments, the tone mapping function incorporates an unsharp-masking-like contrast enhancement that is applied to the object region (i.e., non-background region) that are identified in the classification record 18. In some of these embodiments, the tone mapping function that is used for the object region pixels is defined in equation (4) as follows:

$$T(\hat{L}(x, y)) = s \cdot \begin{cases} t(\hat{L}(x, y)/t)^{\gamma}, & 0 \leq \hat{L}(x, y) \leq t \\ 1 - b((1 - \hat{L}(x, y))/t)^{\gamma}, & t \leq \hat{L}(x, y) \leq 1 \end{cases} \tag{4}$$

where s=255 for 8-bit images, b=t$^{\gamma}$(1−t)$^{1-\gamma}$ and t=$\bar{I}$/s is the normalized mean luminance value of the image. In these embodiments, in response to determinations that the corresponding estimated illuminant values are below a illuminant threshold value, the image enhancement module 46 sets pixel values of the enhanced image darker than spatially corresponding ones of the pixel values of the given image. In addition, in response to determinations that the corresponding estimated illuminant values are above the illuminant threshold value, the image enhancement module 46 sets pixel values of the enhanced image lighter than spatially corresponding ones of the pixel values of the given image.

In other ones of these embodiments, the tone mapping function that is used for the non-background (i.e., object region) pixels is defined in equation (5) as follows:

$$T(\hat{L}(x, y)) = s \cdot \begin{cases} t(\hat{L}(x, y)/t)^{\gamma} & 0 \leq x \leq t \\ \hat{L}(x, y), & t \leq x \leq 1 \end{cases} \tag{5}$$

Figure 10:
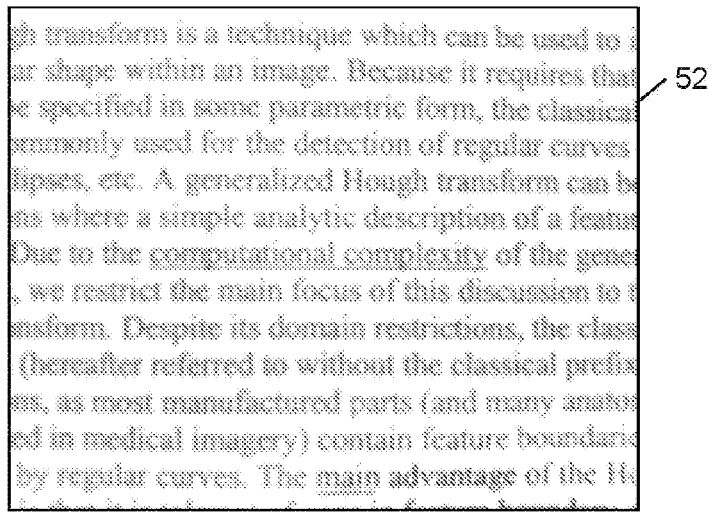
FIG. 10 is an example of an illumination-corrected image derived from the image of FIG. 2 based on the illuminant values shown in FIG. 9 in accordance with an embodiment of the invention.

FIG. 10 shows an example of an illumination-corrected image 52 that is derived from the image 22 (FIG. 2) based on the illuminant values shown in FIG. 9 and the tone mapping function defined in equation (4).

D. Selective Sharpening

In some embodiments, selective sharpening is achieved by applying unsharp masking selectively to target object regions (e.g., text regions) that are identified in the classification record 18. In some of these embodiments, the pixel values of the object regions ($E_{OBJECT}$(x,y)) of the enhanced image 48 are computed by the selective filter defined in equation (6), which incorporates an unsharp masking element in the illumination correction filter defined in equation (3):

$$E_{OBJECT}(x, y) = s \cdot \frac{(\alpha + 1) \cdot I(x, y) - \alpha \cdot \hat{L}(x, y)}{T(\hat{L}(x, y))} \tag{6}$$

where α is an empirically determined parameter value that dictates the amount of sharpening.

In some embodiments, the pixel values of the object regions (E'$_{OBJECT}$(x,y)) of the enhanced image 48 are computed by applying the selective filter defined in equation (7) to the pixel values ($E_{OBJECT}$(x,y)) generated by the selective sharpening filter defined in equation (6).

$$E'(x,y) = (\beta + 1) \cdot E_{OBJECT}(x,y) - \beta \cdot G[E_{OBJECT}] \tag{7}$$

where G[ ] represents a Gaussian smoothing filter and the parameter β represents the amount of sharpening. In some embodiments, the size (w) of the Gaussian kernel and the amount of sharpening β are determined from equations (8) and (9), respectively:

$$w = \begin{cases} w_{min}, & \text{if } (g_{max} > g_H) \\ [w_{min}(g_{max} - g_L) + w_{max}(g_H - g_{max})]/(g_H - g_L), & g_L \leq g_{max} \leq g_H \\ w_{max}, & \text{if } (g_{max} < g_L) \end{cases} \tag{8}$$

$$\beta = \begin{cases} \beta_{min}, & \text{if } (g_{max} > g_H) \\ [\beta_{min}(g_{max} - g_L) + \beta_{max}(g_H - g_{max})]/(g_H - g_L), & g_L \leq g_{max} \leq g_H \\ \beta_{max}, & \text{if } (g_{max} < g_L) \end{cases} \tag{9}$$

where [$w_{min}$, $w_{max}$] is an empirically determined parameter value range for the window size, [$\beta_{min}$, $\beta_{max}$] is an empirically determined parameter value range for the amount of sharpening, and [$g_L$, $g_H$] is the low and high thresholds of the sharpness, $g_{max}$ is the maximum gradient magnitude value determined in block 24 in the method shown in FIG. 3. In some embodiments, the Gaussian smoothing filter G[ ] in equation (7) may be replaced by a different type of smoothing filter (e.g., an averaging filter).

Figure 11:
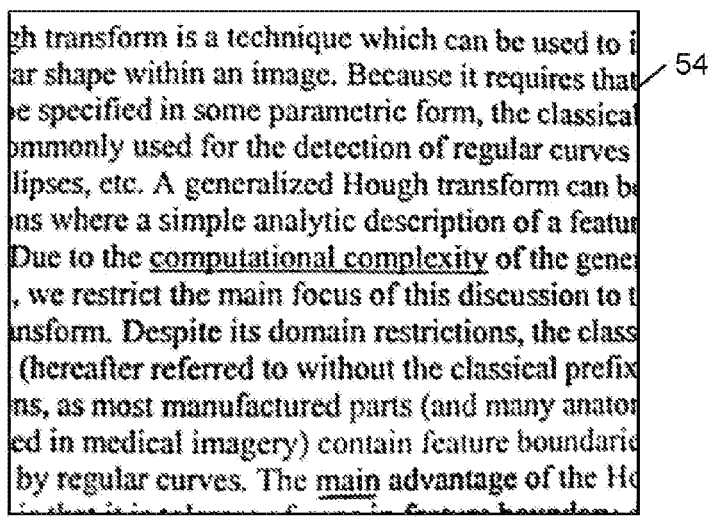
FIG. 11 is an example of a sharpened image derived from the image of FIG. 10 in accordance with an embodiment of the invention.

FIG. 11 depicts an example of a selectively sharpened image 54 that was derived from the image 52 (see FIG. 9) in accordance with the selective sharpening methods defined in equations (6)-(9).

V. Exemplary Architectures of the Image Processing System

A. Overview

Embodiments of the image processing system 10 (including the embodiment 44 shown in FIG. 8) may be implemented by one or more discrete modules (or data processing components) that are not limited to any particular hardware, firmware, or software configuration. In the illustrated embodiments, the modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (e.g., machine-readable code, such as computer software) for implementing the methods that are executed by the embodiments of the image processing system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the image processing system 10 may be implemented in any one of a wide variety of electronic devices, including desktop and workstation computers, video recording devices (e.g., VCRs and DVRs), cable or satellite set-top boxes capable of decoding and playing paid video programming, and digital camera devices. Due to its efficient use of processing and memory resources, some embodiments of the image processing system 10 may be implemented with relatively small and inexpensive components that have modest processing power and modest memory capacity. As a result, these embodiments are highly suitable for incorporation in compact camera environments that have significant size, processing, and memory constraints, including but not limited to handheld electronic devices (e.g., a mobile telephone, a cordless telephone, a portable memory device such as a smart card, a personal digital assistant (PDA), a solid state digital audio player, a CD player, an MCD player, a game controller, a pager, and a miniature still image or video camera), pc cameras, and other embedded environments.

B. A First Exemplary Image Processing System Architecture

Figure 12:
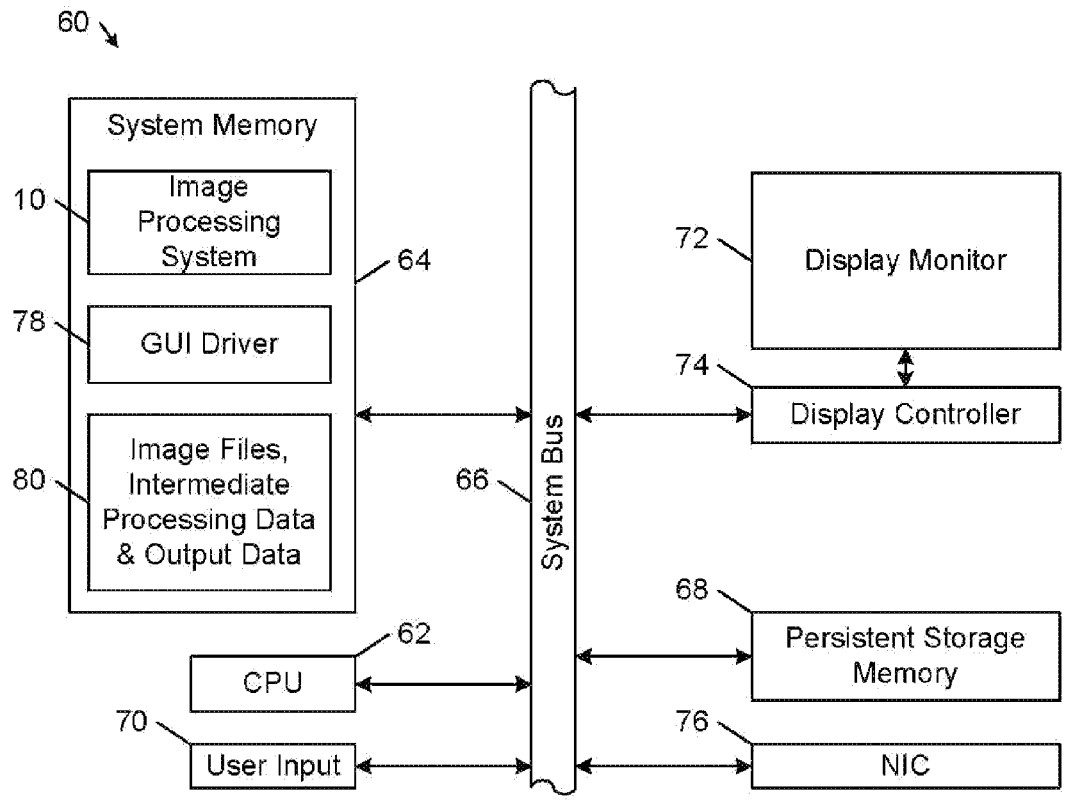
FIG. 12 is a block diagram of an embodiment of an apparatus incorporating an embodiment of the image processing system of FIG. 1.

FIG. 12 shows an embodiment of a computer system 60 that incorporates any of the embodiments of the image processing system 10 described herein. The computer system 60 includes a processing unit 62 (CPU), a system memory 64, and a system bus 66 that couples processing unit 62 to the various components of the computer system 60. The processing unit 62 typically includes one or more processors, each of which may be in the form of any one of various commercially available processors. The system memory 64 typically includes a read only memory (ROM) that stores a basic input/output system (BIOS) that contains start-up routines for the computer system 60 and a random access memory (RAM). The system bus 66 may be a memory bus, a peripheral bus or a local bus, and may be compatible with any of a variety of bus protocols, including PCI, VESA, Microchannel, ISA, and EISA. The computer system 60 also includes a persistent storage memory 68 (e.g., a hard drive, a floppy drive, a CD ROM drive, magnetic tape drives, flash memory devices, and digital video disks) that is connected to the system bus 66 and contains one or more computer-readable media disks that provide non-volatile or persistent storage for data, data structures and computer-executable instructions.

A user may interact (e.g., enter commands or data) with the computer 60 using one or more input devices 150 (e.g., a keyboard, a computer mouse, a microphone, joystick, and touch pad). Information may be presented through a graphical user interface (GUI) that is displayed to the user on a display monitor 72, which is controlled by a display controller 74. The computer system 60 also typically includes peripheral output devices, such as speakers and a printer. One or more remote computers may be connected to the computer system 140 through a network interface card (NIC) 76.

As shown in FIG. 12, the system memory 64 also stores the image processing system 10, a GUI driver 78, and a database 80 containing image files corresponding to the image 16 and the enhanced image 48, intermediate processing data, and output data. In some embodiments, the image processing system 10 interfaces with the GUI driver 78 and the user input 70 to control the creation of the classification record 18 and the enhanced image 48. In some embodiments, the computer system 60 additionally includes a graphics application program that is configured to render image data on the display monitor 72 and to perform various image processing operations on the images 16, 48.

C. A Second Exemplary Image Processing System Architecture

Figure 13:
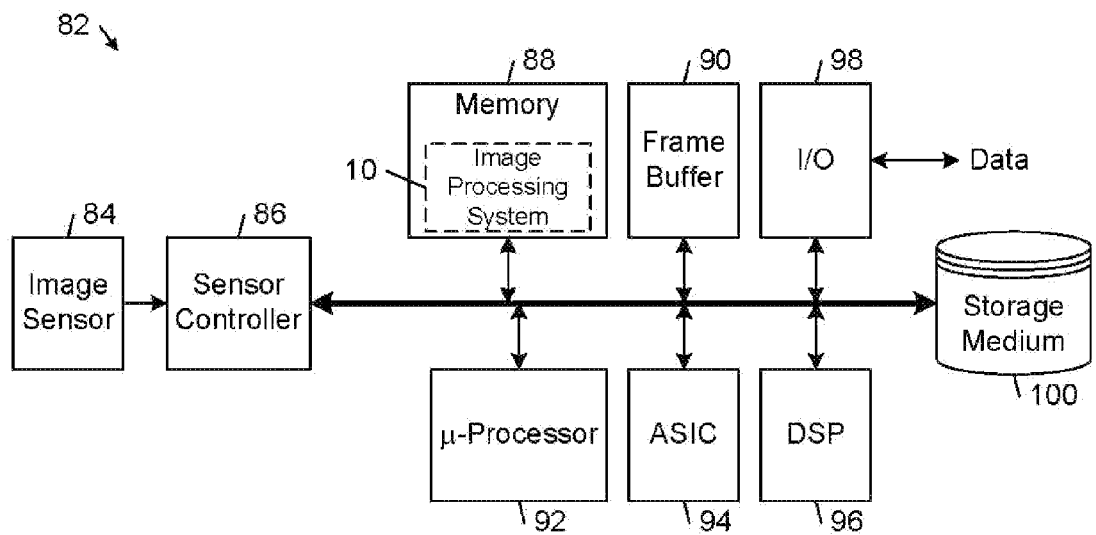
FIG. 13 is a block diagram of an embodiment of an apparatus incorporating an embodiment of the image processing system of FIG. 1.

FIG. 13 shows an embodiment of a digital camera system 82 that incorporates any of the embodiments of the image processing system 10 described herein. The digital camera system 82 may be configured to capture one or both of still images and video image frames. The digital camera system 82 includes an image sensor 84 (e.g., a charge coupled device (CCD) or a complementary metal-oxide-semiconductor (CMOS) image sensor), a sensor controller 86, a memory 88, a frame buffer 90, a microprocessor 92, an ASIC (application-specific integrated circuit) 94, a DSP (digital signal processor) 96, an I/O (input/output) adapter 98, and a storage medium 100. In general, the image processing system 10 may be implemented by one or more of hardware and firmware components. In the illustrated embodiment, the image processing system 10 is implemented in firmware, which is loaded into memory 88. The storage medium 100 may be implemented by any type of image storage technology, including a compact flash memory card and a digital video tape cassette. The image data stored in the storage medium 100 may be transferred to a storage device (e.g., a hard disk drive, a floppy disk drive, a CD-ROM drive, or a non-volatile data storage device) of an external processing system (e.g., a computer or workstation) via the I/O subsystem 98.

The microprocessor 92 choreographs the operation of the digital camera system 82. In some embodiments, the microprocessor 92 is programmed with a mode of operation in which a respective classification record 18 is computed for one or more of the captured images. In some embodiments, a respective enhanced image 48 is computed for one or more of the captured images based on their corresponding classification records 18.

VI. Conclusion

The embodiments that are described in detail herein are capable of segmenting and enhancing images in ways that are robust to noise. These embodiments incorporate global thresholding prior to watershed transform based image segmentation in ways that achieve improved noise resistant results, especially for images containing text. The global thresholding eliminates or breaks noise structures in the images before performing the watershed transform based image segmentations. These embodiments also apply to the watershed transform based segmentation results a unique background segmentation method, which enables background regions of image containing text to be efficiently segmented without placing significant demand on processing and memory resources. Some embodiments use the improved segmentation results to enhance the images in various ways, including correcting for nonuniform illumination, darkening target object regions, and sharpening target object regions. The improved segmentation results not only improve the localization of such enhancements to target object regions, but also improve the quality of the parameter values used to implement such enhancements.

Other embodiments are within the scope of the claims.

What is claimed is:

1. A method, comprising:
   determining gradient magnitude values at respective pixels of a given image;
   thresholding the gradient magnitude values with a global threshold to produce thresholded gradient magnitude values;
   segmenting the pixels into respective groups in accordance with a watershed transform of the thresholded magnitude values; and
   generating a classification record labeling as background pixels ones of the pixels segmented into one of the groups determined to be largest in size and labeling as non-background pixels ones of the pixels segmented into any of the groups except the largest group;
   wherein the determining, the thresholding, the segmenting, and the generating are performed by a computer system.

2. The method of claim 1, wherein the thresholding comprises determining a maximal one of the gradient magnitude values ($g_{MAX}$) and setting the global threshold ($\tau_{GLOBAL}$) to:

$$\tau_{GLOBAL} = \begin{cases} k \cdot g_{MAX} & \text{if } k \cdot g_{MAX} > \tau_{MIN} \\ \tau_{MIN} & \text{otherwise} \end{cases}$$

wherein k is a real number and $\tau_{MIN}$ is a minimum global threshold value.

3. The method of claim 1, wherein the generating comprises recording in the classification record a first binary value for each of the pixels segmented into the largest group and second binary value for each of the pixels segmented into any of the groups except the largest group.

4. The method of claim 1, further comprising, before the determining, deriving the given image from a denoising of an upstream image.

5. The method of claim 1, further comprising producing an enhanced image from the pixel values of the given image and the classification record.

6. The method of claim 5, wherein the producing comprises estimating respective illuminant values for the pixels of the given image, including those pixels labeled as non-background pixels, from the values of those pixels of the given image labeled as background pixels.

7. The method of claim 6, wherein the producing comprises computing pixel values of the enhanced image from ratios of spatially corresponding ones of the pixel values of the given image to respective tone values determined from the estimated illuminant values.

8. The method of claim 7, wherein the computing comprises
   in response to determinations that the corresponding estimated illuminant values are below a illuminant threshold value, setting pixel values of the enhanced image darker than spatially corresponding ones of the pixel values of the given image, and
   in response to determinations that the corresponding estimated illuminant values are above the illuminant threshold value, setting pixel values of the enhanced image lighter than spatially corresponding ones of the pixel values of the given image.

9. The method of claim 6, wherein the producing comprises sharpening the values of ones of the pixels labeled as non-background pixels to produce values of spatially corresponding ones of the pixels of the enhanced image.

10. The method of claim 9, wherein the sharpening comprises calculating pixel values (E'(x,y)) of the enhanced image in accordance with $$E'(x, y) = s \cdot \frac{(\alpha + 1) \cdot I_{GIVEN}(x, y) - \alpha \cdot \hat{L}(x, y)}{T(\hat{L}(x, y))}$$

wherein s is a scale factor, $\alpha$ is a sharpening factor, $I_{GIVEN}$(x,y) is the value of pixel (x,y) in the given image, $\hat{L}$(x,y) is the illuminant value estimated for pixel (x,y), and $T(\hat{L}(x,y))$ is the tone value determined for pixel (x,y).

11. The method of claim 10, wherein the sharpening additionally comprises calculating sharpened pixel values (E"(x, y)) of the output image in accordance with $$E''(x,y) = (\beta+1) \cdot E'(x,y) - \beta \cdot F_S[E'(x,y)]$$

wherein $\beta$ is a sharpening factor, and $F_S[E'(x,y)]$ represents a smoothing filter applied to the pixel values E'(x,y).

12. A non-transitory machine readable medium storing machine-readable instructions causing a machine to perform operations comprising:
   determining gradient magnitude values at respective pixels of a given image;
   thresholding the gradient magnitude values with a global threshold to produce thresholded gradient magnitude values;
   segmenting the pixels into respective groups in accordance with a watershed transform of the thresholded magnitude values; and
   generating a classification record labeling as background pixels ones of the pixels segmented into one of the groups determined to be largest in size and labeling as non-background pixels ones of the pixels segmented into any of the groups except the largest group.

13. The machine readable medium of claim 12, wherein the machine-readable instructions cause the machine to determine a maximal one of the gradient magnitude values ($g_{MAX}$) and set the global threshold ($\tau_{GLOBAL}$) to:

$$\tau_{GLOBAL} = \begin{cases} k \cdot g_{MAX} & \text{if } k \cdot g_{MAX} > \tau_{MIN} \\ \tau_{MIN} & \text{otherwise} \end{cases}$$

wherein k is a real number and $\tau_{MIN}$ is a minimum global threshold value.

14. The machine readable medium of claim 12, wherein the machine-readable instructions cause the machine to produce an enhanced image from the pixel values of the given image and the classification record and to estimate respective illuminant values for the pixels of the given image, including those pixels labeled as non-background pixels, from the values of those pixels of the given image labeled as background pixels.

15. The machine readable medium of claim 12, wherein the machine-readable instructions cause the machine to produce an enhanced image from the pixel values of the given image and the classification record and to sharpen the values of ones of the pixels labeled as non-background pixels to produce values of spatially corresponding ones of the pixels of the enhanced image.

16. An apparatus, comprising:
a memory storing processor-readable instructions; and
a processor coupled to the memory, operable to execute the instructions, and based at least in part on the execution of the instructions operable to perform operations comprising
determining gradient magnitude values at respective pixels of a given image and to threshold the gradient magnitude values with a global threshold to produce thresholded gradient magnitude values; and
segmenting the pixels into respective groups in accordance with a watershed transform of the thresholded magnitude values, and generate a classification record labeling as background pixels ones of the pixels segmented into one of the groups determined to be largest in size and labeling as non-background pixels ones of the pixels segmented into any of the groups except the largest group.

17. The apparatus of claim 16, wherein, based at least in part on the execution of the instructions, the processor is operable to perform operations comprising determining a maximal one of the gradient magnitude values ($g_{MAX}$) and set the global threshold ($\tau_{GLOBAL}$) to:

$$\tau_{GLOBAL} = \begin{cases} k \cdot g_{MAX} & \text{if } k \cdot g_{MAX} > \tau_{MIN} \\ \tau_{MIN} & \text{otherwise} \end{cases}$$

wherein k is a real number and $\tau_{MIN}$ is a minimum global threshold value.

18. The apparatus of claim 17, wherein, based at least in part on the execution of the instructions, the processor is operable to perform operations comprising producing an enhanced image from the pixel values of the given image and the classification record.

19. The apparatus of claim 18, wherein, based at least in part on the execution of the instructions, the processor is operable to perform operations comprising estimating respective illuminant values for the pixels of the given image, including those pixels labeled as non-background pixels, from the values of those pixels of the given image labeled as background pixels.

20. The apparatus of claim 19, wherein, based at least in part on the execution of the instructions, the processor is operable to perform operations comprising sharpening the values of ones of the pixels labeled as non-background pixels to produce values of spatially corresponding ones of the pixels of the enhanced image.

* * * * *